(12) United States Patent
Li et al.

(10) Patent No.: US 10,178,326 B2
(45) Date of Patent: Jan. 8, 2019

(54) METHOD AND APPARATUS FOR SHOOTING IMAGE AND TERMINAL DEVICE

(71) Applicant: GUANGDONG OPPO MOBILE TELECOMMUNICATIONS CORP., LTD., Dongguan (CN)

(72) Inventors: Xiaopeng Li, Dongguan (CN); Gong Zhang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/623,158

(22) Filed: Jun. 14, 2017

(65) Prior Publication Data

US 2018/0152642 A1    May 31, 2018

(30) Foreign Application Priority Data

Nov. 29, 2016   (CN) .......................... 2016 1 1079528

(51) Int. Cl.
*H04N 5/265* (2006.01)
*H04N 5/355* (2011.01)
(Continued)

(52) U.S. Cl.
CPC .............. *H04N 5/265* (2013.01); *G06T 5/20* (2013.01); *G06T 7/11* (2017.01); *H04N 5/2258* (2013.01);
(Continued)

(58) Field of Classification Search
CPC ................................ H04N 5/265; G06T 5/004
See application file for complete search history.

(56) References Cited

U.S. PATENT DOCUMENTS 9,473,708 B1 * 10/2016 D'Amico ............... H04N 5/265
2006/0245014 A1   11/2006 Haneda
(Continued)

FOREIGN PATENT DOCUMENTS

CN      103986875 A      8/2014
CN      105472266 A      4/2016
(Continued)

OTHER PUBLICATIONS

European Patent Application No. 17177453.2 Extended Search and Opinion dated Nov. 24, 2017, 8 pages.
(Continued)

*Primary Examiner* — Christopher K Peterson
(74) *Attorney, Agent, or Firm* — Lathrop Gage LLP (57) ABSTRACT

A method and an apparatus for shooting an image and a terminal device are provided. The method is applied in a terminal device having a first camera assembly and a second camera assembly, and includes: controlling n adjacent pixel points corresponding to a same filter unit in the second image sensor to be under respective different amounts of exposure; obtaining a first image and a second image of an object respectively by the first image sensor and the second image sensor; performing an image splitting on the second image to obtain a third image having a same number of pixels as the first image; performing an image composition on the third image and the first image to obtain a high dynamic range image of the object.

20 Claims, 5 Drawing Sheets

(51) Int. Cl.
  *H04N 5/225* (2006.01)
  *G06T 7/11* (2017.01)
  *H04N 5/247* (2006.01)
  *G06T 5/20* (2006.01)
  *H04N 5/235* (2006.01)

(52) U.S. Cl.
  CPC ........... *H04N 5/2355* (2013.01); *H04N 5/247* (2013.01); *H04N 5/35554* (2013.01); *H04N 5/35563* (2013.01); *G06T 2207/10016* (2013.01)

(56) References Cited

U.S. PATENT DOCUMENTS

| | | | |
|---|---|---|---|
| 2011/0122289 A1 | 5/2011 | Ward | |
| 2014/0232900 A1 | 8/2014 | Wernersson | |
| 2015/0002704 A1 | 1/2015 | Vidal-Naquet | |
| 2015/0103200 A1* | 4/2015 | Vondran, Jr. | G06T 5/002 348/223.1 |
| 2018/0075586 A1* | 3/2018 | Swami | G06T 7/136 |

FOREIGN PATENT DOCUMENTS

| | | |
|---|---|---|
| CN | 105721798 A | 6/2016 |
| CN | 106454149 A | 2/2017 |
| EP | 3185537 A1 | 6/2017 |
| WO | WO 2013090922 A1 | 6/2013 |

OTHER PUBLICATIONS

PCT/CN2017/090639 English translation of International Search Report and Written Opinion dated Sep. 18, 2017, 13 pages.

* cited by examiner

METHOD AND APPARATUS FOR SHOOTING IMAGE AND TERMINAL DEVICE

CROSS-REFERENCE TO RELATED APPLICATIONS

This application is based on and claims priority of Chinese Patent Application No. 201611079528.8, filed on Nov. 29, 2016.

FIELD

The present disclosure relates to the electronic technology field, and more particularly to a method and an apparatus for shooting an image, and a terminal device.

BACKGROUND

With the development of electronic products and image processing technologies, people have higher and higher requirements on the effect of images. HDR (High-Dynamic Range) images, which have advantages of rich layers, strong reality, great high-dynamic range, and better lighting effect for restoring real scenarios, have been concerned by many people.

DISCLOSURE

Embodiments of the present disclosure provide a method for shooting an image. The method is applied in a terminal device having a first camera assembly and a second camera assembly, in which each filter unit in the first camera assembly is corresponding to one pixel point of a first image sensor of the first camera assembly, and each filter unit in the second camera assembly is corresponding to n adjacent pixel points of a second image sensor of the second camera assembly, where n is greater than or equal to 2. The method includes: controlling the n adjacent pixel points corresponding to a same filter unit in the second image sensor to be under respective different amounts of exposure; obtaining a first image and a second image of an object respectively by the first image sensor and the second image sensor; performing an image splitting on the second image to obtain a third image having a same number of pixels as the first image; and performing an image composition on the third image and the first image to obtain an HDR image of the object.

Embodiments of the present disclosure provide an apparatus for shooting an image. The apparatus includes a first camera assembly and a second camera assembly. The first camera assembly includes a plurality of first filter units and a first image sensor, the plurality of first filter units are corresponding to a plurality of pixel points of the first image sensor in a one-to one relationship. The second camera assembly includes a plurality of second filter units and a second image sensor, and each of the plurality of second filter units is corresponding to n adjacent pixel points of a plurality of pixel points of the second image sensor, where n is greater than or equal to 2. The apparatus includes: a processor, configured to control the n adjacent pixel points corresponding to a same filter unit in the second image sensor to be under respective different amounts of exposure; obtain a first image and a second image of an object respectively by the first image sensor and the second image sensor; perform an image splitting on the second image to obtain a third image having a same number of pixels as the first image; and perform an image composition on the third image and the first image to obtain an HDR image of the object.

Embodiments of the present disclosure provide a terminal device. The terminal device includes a housing, a processor, a memory, a circuit board, a power supply circuit, a first camera assembly and a second camera assembly received in the housing, in which each filter unit in the first camera assembly is corresponding to one pixel point of a first image sensor of the first camera assembly, and each filter unit in the second camera assembly is corresponding to n adjacent pixel points of a second image sensor of the second camera assembly, where n is greater than or equal to 2. The circuit board is enclosed by the housing, and the processor and the memory are positioned on the circuit board. The power supply circuit is configured to provide power for respective circuits or components of the terminal device. The memory is configured to store executable program codes. The processor is configured to run a program corresponding to the executable program codes by reading the executable program codes stored in the memory, to perform following operations: controlling the n adjacent pixel points corresponding to a same filter unit in the second image sensor to be under respective different amounts of exposure; obtaining a first image and a second image of an object respectively by the first image sensor and the second image sensor; performing an image splitting on the second image to obtain a third image having a same number of pixels as the first image; and performing an image composition on the third image and the first image to obtain an HDR image of the object.

BRIEF DESCRIPTION OF THE DRAWINGS

Above and/or other aspects and advantages of the present disclosure will become clearer and easier to understand from following description to embodiments with reference to drawings, in which.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

With respect to problems of long shooting time and bad shooting effect in the existing method for shooting images, respective embodiments of the present disclosure provide a method for shooting an image, which utilizes two cameras to shoot two images, one camera obtaining one normal image, the other camera obtaining one image with different exposure, and then processes the two images to obtain one HDR image.

In the following, a method and an apparatus for shooting an image and a terminal device according to embodiments of the present disclosure are described with reference to drawings.

In order to clearly illustrate and explain the method for shooting an image provided in the present disclosure, a structure of a second camera assembly provided in the present disclosure is first illustrated in detail.

The method for shooting an image provided by embodiments of the present disclosure is applied in a terminal device having a first camera assembly and a second camera assembly. The terminal device may be of any type, for example, may be a mobile phone, an IPAD, a smart wearable device, or the like.

The first camera assembly may adopt the general structure of camera assembly, including a first filter array and a first image sensor, and each filter unit in the first filter array being corresponding to one pixel of the first image sensor, such that respective photosensitive pixels in the first image sensor generate electric signals by receiving optical signals filtered by respective filter units in the filter array, and an image is outputted by exposure.

In detail, the first image sensor may be a CCD (Charge Coupled Device) image sensor, or may be a CMOS (Complementary Metal-Oxide-Semiconductor Transistor) image sensor, which is not limited in the present disclosure.

Figure 1:
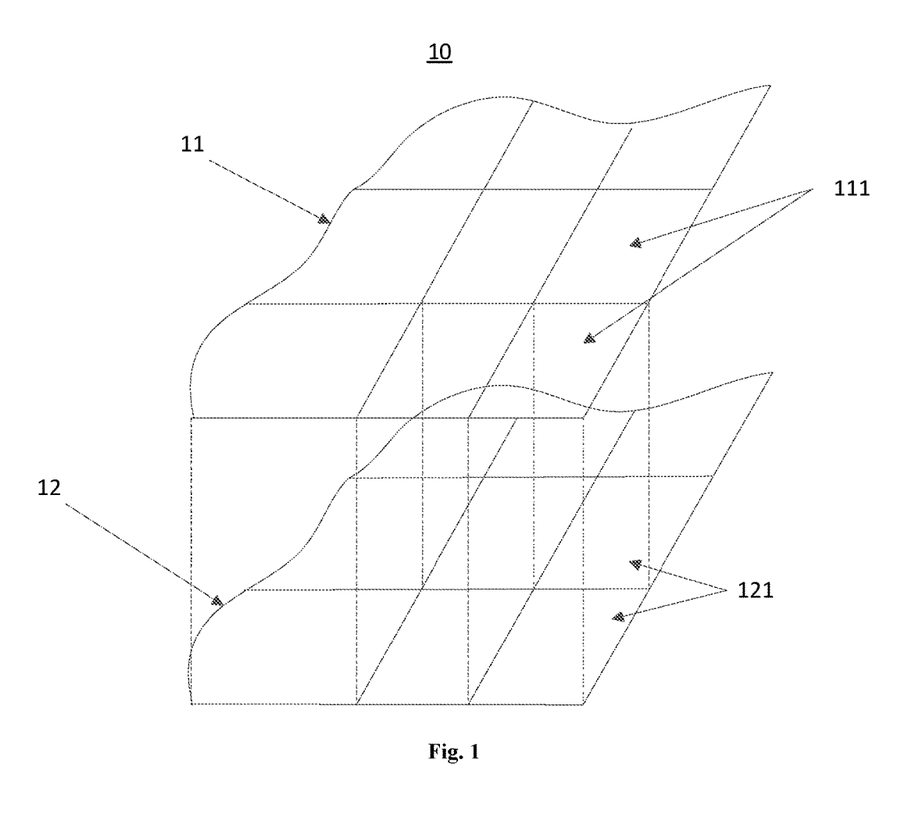
FIG. 1 is a schematic diagram showing a spatial structure of a first camera assembly provided in embodiments of the present disclosure.

The structure of the second camera assembly in the present embodiments is illustrated below with reference to FIG. 1. FIG. 1 is a schematic diagram illustrating a spatial structure of a first camera assembly provided by embodiments of the present disclosure.

As illustrated in FIG. 1, the first camera assembly 10 includes a first filter unit array 11 and a first image sensor 12.

The first filter unit array 11 includes a plurality of first filter units 111 corresponding to a plurality of pixel points of the first image sensor 12 in a one-to-one relationship, i.e., each first filter unit 111 is corresponding to one pixel point 121 in the first image sensor 12.

In addition, the structure of the second camera assembly is same as the structure of the first camera assembly, but each filter unit in the second camera assembly corresponds to one combination pixel in the second image sensor. Each combination pixel includes n adjacent pixel points, where n is greater than or equal to 2. The structure of the second camera assembly in the present embodiments is illustrated below with reference to FIG. 2.

Figure 2:
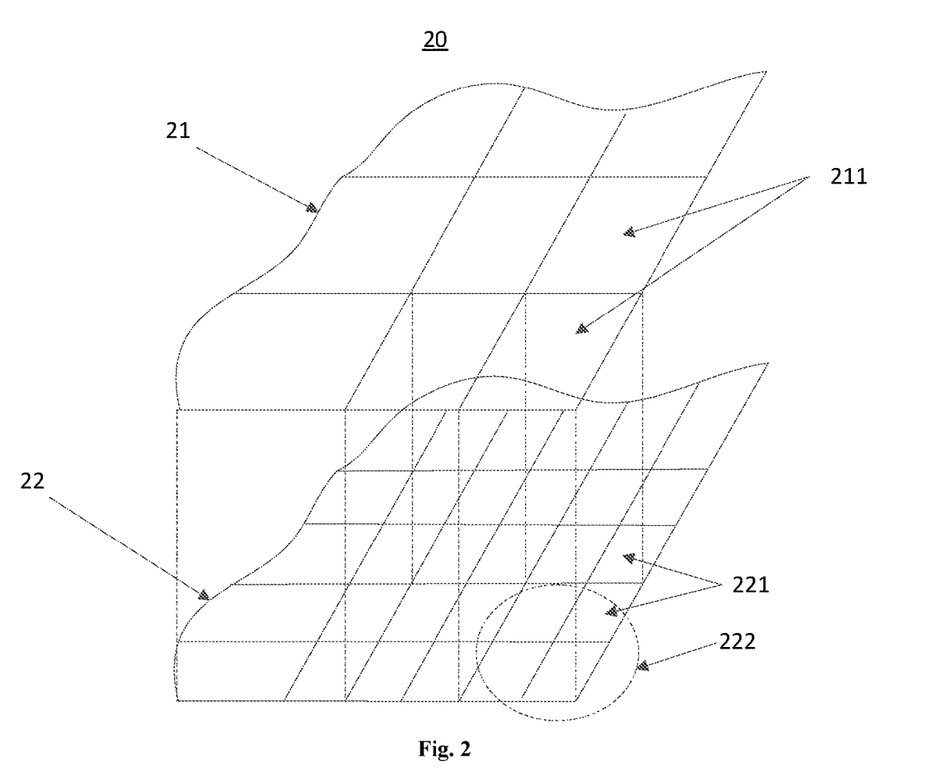
FIG. 2 is a schematic diagram showing a spatial structure of a second camera assembly provided in embodiments of the present disclosure.

FIG. 2 is a schematic diagram illustrating a spatial structure of a second camera assembly provided by embodiments of the present disclosure.

As illustrated in FIG. 2, the second camera assembly 20 includes a second filter unit array 1 and a second image sensor 2.

The filter unit array 21 includes a plurality of second filter units 211, and each filter unit 211 is corresponding to n adjacent pixel points 221 in the second image sensor 22, where n is greater than or equal to 2. Although n may be a number greater than or equal to 2, the imaging quality of the second image sensor 2 is optimum when n=4, such that FIG. 2 illustrates an example in which n=2*2 pixel points.

Based on the structure illustrated in FIG. 2, in the second camera assembly, every 2*2 pixel points in the second image sensor 22 are combined to form one combination pixel 222, and then one image with different exposure can be obtained by controlling different pixel points in each combination pixel 222 to be under different amounts of exposure.

In detail, the second image sensor may be a CCD (Charge Coupled Device) image sensor, or may be a CMOS (Complementary Metal-Oxide-Semiconductor Transistor) image sensor, which is not limited in the present disclosure.

Based on the above structure of the second camera assembly and the first camera assembly, the method for shooting an image provided by embodiments of the present disclosure is described below with reference to FIG. 3.

Figure 3:
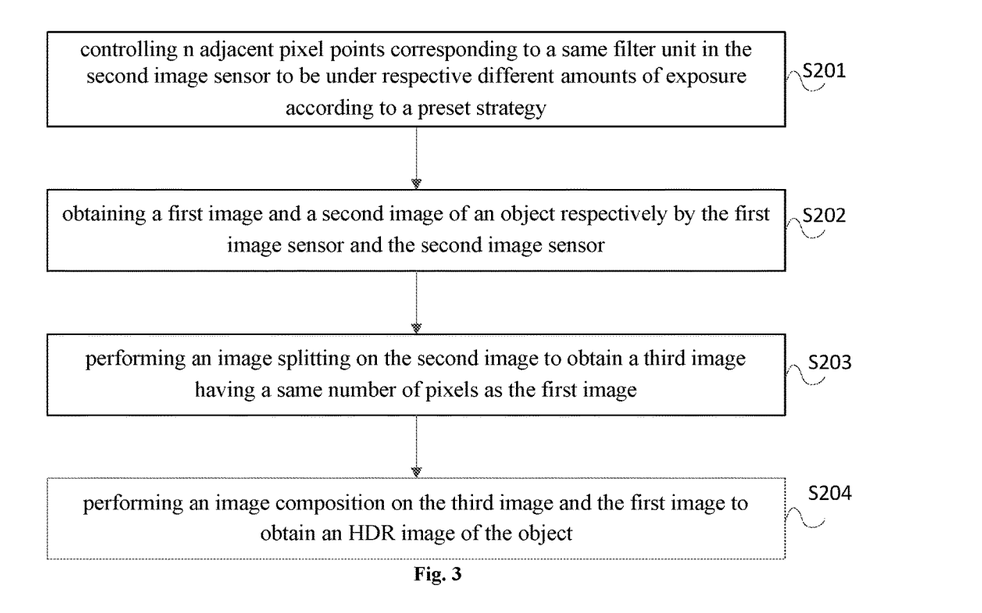
FIG. 3 is a flow chart of a method for shooting an image according to an embodiment of the present disclosure.

FIG. 3 is a flow chart of a method for shooting an image according to an embodiment of the present disclosure.

As illustrated in FIG. 3, the method for shooting an image includes following acts.

At block S201, n adjacent pixel points corresponding to the same filter unit in the second image sensor are controlled to be under respective different amounts of exposure.

At block S202, a first image and a second image of an object to be shot are obtained respectively by the first image sensor and the second image sensor.

The amount of exposure refers to a time integration of illumination received by the image sensor over the exposure duration. Accordingly, the amount of exposure has a direct relationship with the exposure duration and the illumination.

In embodiments of the present disclosure, in order to obtain an image having a wider dynamic range and more image details than an ordinary image, n pixels points in one combination pixel can be controlled to be under different amounts of exposure, for obtaining a second image of the object to be shot. Each combination pixel in the second image is formed of n pixel points under different amounts of exposure, that is, the second image includes a set of all pixels of n images of the object to be shot under n kinds of exposure.

In a specific implementation, since the amount of exposure received by each pixel point in the image sensor is related to the illumination and the exposure duration, the amount of exposure for each pixel point in the second image sensor can be controlled by controlling the exposure duration and the illumination.

In other words, controlling the n adjacent pixel points corresponding to a same filter unit in the second image sensor to be under respective different amounts of exposure includes: controlling the n adjacent pixel points corresponding to a same filter unit in the second image sensor to be subjected to respective different exposure durations; and/or controlling n adjacent pixel points corresponding to a same filter unit in the second image sensor to be corresponding to respective different illuminations.

In a specific implementation, the exposure durations or illuminations of pixel points in each combination pixel can be controlled in many ways. Taking the CMOS image sensor as an example, an analog signal processing circuit, a digital conversion circuit, a row selection switch, a column selection switch, an amplifier a photosensitive cell array, etc. are integrated in a same CMOS image sensor chip. By controlling the row selection switch and the column selection switch to turn on or off, the photosensitive cell array is controlled to turn on or off, such that the illumination received by the image sensor can be controlled, thus controlling the amount of exposure. In an embodiment of the present disclosure, by controlling the duration in which the row selection switch and the column selection switch are turned on or off, the duration in which the photosensitive cell array is turned on or off can be controlled, such that the duration in which the image sensor undergoes the exposure can be controlled, thus controlling the amount of exposure. Other ways can also be used. Thus, the second image of the object to be shot is obtained by the second image sensor.

In embodiments of the present disclosure, by controlling different pixel points of the same combination pixel in the second image sensor to be under different amounts of exposure, one image with respective combination pixel having different amounts of exposure is obtained, which takes less time than obtaining multiple images respectively under different amounts of exposure. Moreover, since n is greater than or equal to 2, the HDR image obtained has a better shading transition, and represents more realistic colors.

In embodiments of the present disclosure, since the second image of the object is obtained by the second image sensor when pixel points are under different amounts of exposure, a part of the object having a higher brightness may be darker in the image, and a part of the object having a lower brightness may be brighter in the image, resulting in image distortion. In embodiments of the present disclosure, each filter unit in the first camera assembly is corresponding to one pixel point in the first image sensor, that is, the first image sensor in the first camera assembly still receives light in a conventional way, and a normal image of the object, i.e., the first image, is obtained by the first image sensor.

At block S203, an image splitting is performed on the second image to obtain a third image having a same number of pixels as the first image.

At block S204, an image composition is performed on the third image and the first image to obtain an HDR image of the object.

In a specific implementation, in order to obtain the HDR image using the first image and the second image, the first image and the second image may be composited. However, in a possible implementation of the present disclosure, the number of pixels in the first image may be different from the number of pixels in the second image, and thus it is not possible to composite the first image and the second image into one image. Therefore, in embodiments of the present disclosure, before image composition using the first image and the second image, the image splitting is performed on the second image, so as to obtain the third image having the same number of pixels as the first image.

In detail, an interpolation operation may be performed on the pixels in the second image, so as to obtain the third image having the same number of pixels as the first image.

The interpolation operation may be preset, or may be determined according to specific situations of the second image. In detail, it may be a bilinear interpolation algorithm, or a bicubic interpolation algorithm. By performing the interpolation operation on the second image, new pixel points can be generated, thus obtaining the third image having the same number of pixels as the first image.

The image composition is performed on the first image and the third image, and thus the HDR image of the object is obtained. With respect to specific composition methods, reference can be made to the related art, which will not be elaborated herein.

In embodiments of the present disclosure, the first image sensor and the second image sensor have the same number of pixel points, otherwise the third image having the same number of pixels as the first image cannot be obtained even if the interpolation operation is performed on the second image. For example, assume that the first image sensor has 16 million pixel points, the second image sensor has 8 million pixel points, and n is 4. After the pixel binning, the second image sensor has 2 million pixels. In order to avoid mosaics or particles in the third image obtained after the interpolation operation, the third image has at most 8 million pixel points, that is, it is not possible that the third image has the same number of pixel points as the first image.

In addition, it can be understood that, when the object is in a scenario having a great contrast between light and shade, the apparatus for shooting images can automatically shoot an HDR image, or can shoot an HDR image after receiving a command from the user. That is, in embodiments of the present disclosure, before controlling the n adjacent pixel points corresponding to a same filter unit in the second image sensor to be under respective different amounts of exposure, a command for shooting the HDR image may be received.

The command for shooting the HDR image may be triggered by the user through clicking, sliding, or long-pressing a button having the command of shooting the HDR image.

With the method for shooting an image according to embodiments of the present disclosure, the n adjacent pixel points corresponding to the same filter unit in the second image sensor are controlled to be under different amounts of exposure, and the first image and the second image of the object to be shot are obtained by the first image sensor and the second image sensor respectively, and then the image splitting is performed on the second image to obtain the third image having the same number of pixels as the first image, and finally the third image and the first image are composited to obtain the HDR image of the object to be shot. Thus, two camera assemblies are used for shooting, the first camera assembly being used to obtain one normal image, and the second camera assembly being used to obtain one image with respective combination pixel having different amounts of exposure, and then the two images are composited to generate the HDR image, thus reducing the time used for shooting the HDR image, enhancing the effect of shooting the image, and improving the user experience.

It can be seen from the above description that, the second image of the object can be obtained by controlling different pixel points of the combination pixel in the second image sensor to be under different amounts of exposure, and then the splitting processing is performed on the second image for image composition with the first image obtained by the first camera assembly to obtain the HDR image. In a possible implementation, when respective pixel points of the same combination pixel in the second image sensor are under different illuminations so as to realize different amounts of exposure for different pixel points in the same combination pixel, luminance of some pixel points may be too big or insufficient due to features such as structure or material of the object. Detailed description will be given in the following with reference to FIG. 4.

Figure 4:
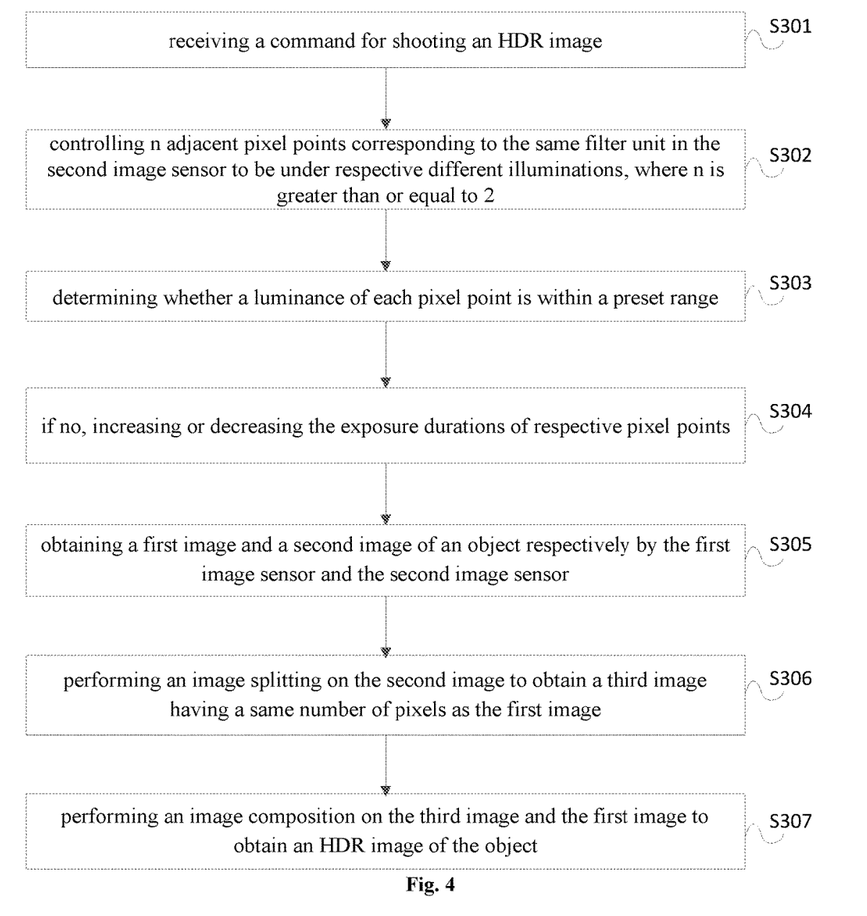
FIG. 4 is a flow chart of a method for shooting an image according to another embodiment of the present disclosure.

FIG. 4 is a flow chart of a method for shooting an image according to another embodiment of the present disclosure.

As illustrated in FIG. 4, the method for shooting an image includes following acts.

At block S301, a command for shooting an HDR image is received.

At block S302, n adjacent pixel points corresponding to a same filter unit in the second image sensor are controlled to be under respective different illuminations, where n is greater than or equal to 2.

It can be understood that, since the amount of the exposure is related to the exposure duration and the illumination, it is possible to realize different amounts of exposure for different pixel points in the same combination pixel by adjusting respective exposure durations and illuminations corresponding to different pixel points in the same combination pixel.

In an embodiment of the present disclosure, different amounts of exposure for different pixel points in the same combination pixel is realized by controlling different pixel points in the same combination pixel to be under different illuminations and same exposure duration.

At block S303, it is determined whether a luminance of each pixel point is within a preset range.

At block S304, if it is determined that the luminance of any pixel point is out of the present range, the exposure durations of respective pixel points are decreased or increased.

The luminance refers to a degree of brightness presented by a surface of the object under light.

It can be understood that, during shooting an image, different degrees of brightness may be presented due to light direction and structure or material of the object, even if the object is under the same illumination. Thus, after the exposure durations and illuminations for respective pixel points in the same combination pixel are determined, a certain part of the object may become whiter in the image due to overexposure or become unclear due to underexposure, if the luminance of this part is too high or too low. In embodiments of the present disclosure, in order to avoid overexposure or underexposure area in the image obtained by the second camera assembly, a range may be set for the luminance, and if the luminance of a certain pixel point is not within the range, the exposure duration of this pixel point is increased or decreased, thus avoiding overexposure or underexposure.

The preset range may be determined according to empirical values. For example, under normal conditions, when the illumination is 1 lux, detailed features of the object can be obtained truly if the luminance of the pixel point is within the range of 10-20 nit, and thus the preset range may be 10-20 nit. Moreover, the preset range may be adjusted according to factors such as structure or material of the object, which is not limited herein.

In a specific implementation, taking the CMOS image sensor as an example, the duration in which the row selection switch and column selection switch integrated in the same CMOS image sensor chip are turned on or off is controlled, such that the duration in which the photosensitive cell array is turned on or off is controlled, thus decreasing or increasing the exposure durations of respective pixel points.

For example, assume that the illumination of a certain pixel point is 1 lux, the exposure duration is 1 s, and the preset range is 10-20 nit. Then, if the luminance of the pixel point is 5 nit, which is below the preset range, the exposure duration can be increased, for example, set to 2 s, thus avoiding the underexposure.

At block S305, a first image and a second image of the object are obtained respectively by the first image sensor and the second image sensor.

At block S306, an image splitting is performed on the second image to obtain a third image having a same number of pixels as the first image.

At block S307, an image composition is performed on the third image and the first image to obtain an HDR image of the object.

With respect to specific implementations and principles of blocks S301-S302 and blocks S305-S307, reference can be made to description of blocks S201-S204 in the above embodiment, which is not elaborated here.

With the method for shooting an image according to embodiments of the present disclosure, after the command for shooting an HDR image is received, the n adjacent pixel points corresponding to the same filter unit in the second image sensor are controlled to be corresponding to different illuminations, and when the luminance of a certain pixel point is not within the preset range, the exposure durations of the pixel points are adjusted, and then the first image and the second image of the object to be shot are obtained by the first image sensor and the second image sensor respectively, and the image splitting is performed on the second image to obtain the third image having the same number of pixels as the first image, and finally the third image and the first image are composited to obtain the HDR image of the object to be shot. Thus, two camera assemblies are used for shooting, the first camera assembly being used to obtain one normal image, and the second camera assembly being used to obtain one image with respective combination pixel having different amounts of exposure, and then the two images are composited to generate the HDR image, during which the exposure durations of respective pixel points are adjusted dynamically according to the luminance of the pixel points, thus reducing the time used for shooting the HDR image, enhancing the effect of shooting the image, and improving the user experience.

Figure 5:
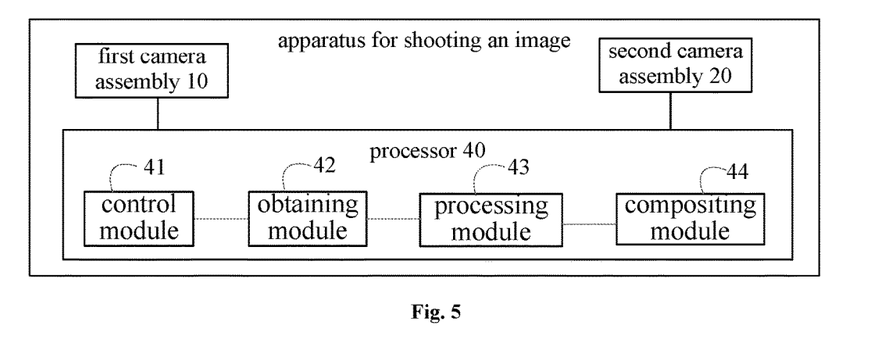
FIG. 5 is a block diagram of an apparatus for shooting an image according to an embodiment of the present disclosure.

FIG. 5 is a block diagram of an apparatus for shooting an image according to an embodiment of the present disclosure.

In detail, the apparatus for shooting an image includes a first camera assembly 10 and a second camera assembly 20. The first camera assembly includes a plurality of first filter units and a first image sensor, the plurality of first filter units are corresponding to a plurality of pixel points of the first image sensor in a one-to-one relationship. The second camera assembly includes a plurality of second filter units and a second image sensor, and each of the plurality of second filter units in the second camera assembly is corresponding to n adjacent pixel points of a plurality of pixel points of the second image sensor, where n is greater than or equal to 2.

As illustrated in FIG. 5, the apparatus for shooting an image includes a processor 40 containing a control module 41, an obtaining module 42, a processing module 43 and a compositing module 44.

The control module 41 is configured to control the n adjacent pixel points corresponding to a same filter unit in the second image sensor to be under respective different amounts of exposure.

The obtaining module 42 is configured to obtain a first image and a second image of an object respectively by the first image sensor and the second image sensor.

The processing module 43 is configured to perform an image splitting on the second image to obtain a third image having a same number of pixels as the first image.

The compositing module 44 is configured to perform an image composition on the third image and the first image to obtain an HDR image of the object.

It should be noted that, the above description for embodiments of the method for shooting an image is also applicable to the apparatus for shooting an image, which is not elaborated here.

With the apparatus for shooting an image according to embodiments of the present disclosure, the n adjacent pixel points corresponding to the same filter unit in the second image sensor are controlled to be under different amounts of exposure, and the first image and the second image of the object to be shot are obtained by the first image sensor and the second image sensor respectively, and then the image splitting is performed on the second image to obtain the third image having the same number of pixels as the first image, and finally the third image and the first image are composited to obtain the HDR image of the object to be shot. Thus, two camera assemblies are used for shooting, the first camera assembly being used to obtain one normal image, and the second camera assembly being used to obtain one image with respective combination pixel having different amounts of exposure, and then the two images are composited to generate the HDR image, thus reducing the time used for shooting the HDR image, enhancing the effect of shooting the image, and improving the user experience.

Figure 6:
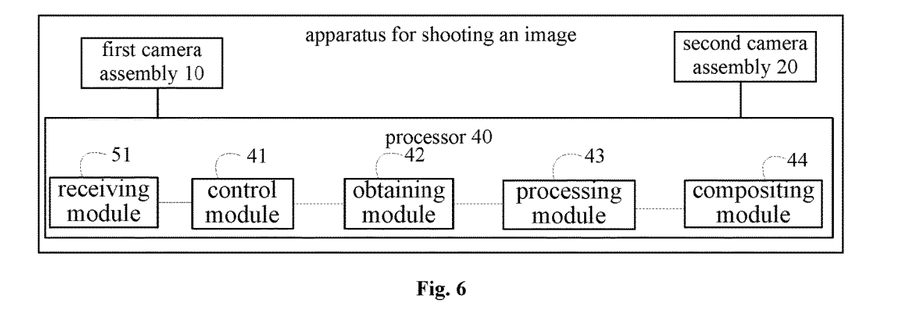
FIG. 6 is a block diagram of an apparatus for shooting an image according to another embodiment of the present disclosure.

FIG. 6 is a block diagram of an apparatus for shooting an image according to another embodiment of the present disclosure.

As shown in FIG. 6, based on FIG. 5, the processor 40 further includes a receiving module 51. The receiving module 51 is configured to receive a command for shooting the HDR image.

In a possible implementation of the present disclosure, the control module 41 is configured to: control n adjacent pixel points corresponding to a same filter unit in the second image sensor to be subjected to respective different exposure durations; and/or control n adjacent pixel points corresponding to a same filter unit in the second image sensor to be corresponding to respective different illuminations.

In another possible implementation of the present disclosure, the control module 41 is further configured to: determine whether a luminance of each pixel point is within a preset range; and increase or decrease the exposure durations of respective pixel points, if the luminance of any pixel point is out of the preset range.

In another possible implementation of the present disclosure, the processing module 43 is configured to perform an interpolation operation on the pixels in the second image to obtain the third image having the same number of pixels as the first image.

In another possible implementation of the present disclosure, each filter unit in the second camera assembly is corresponding to 2*2 adjacent pixel points in the second image sensor.

In another possible implementation of the present disclosure, a number of pixel points in the first image sensor is same as a number of pixel points in the second image sensor.

It should be noted that, the above description for embodiments of the method for shooting an image is also applicable to the apparatus for shooting an image in this embodiment, which is not elaborated here.

With the apparatus for shooting an image according to embodiments of the present disclosure, after the command for shooting an HDR image is received, the n adjacent pixel points corresponding to the same filter unit in the second image sensor are controlled to be corresponding to different illuminations, and when the luminance of a certain pixel point is not within the preset range, the exposure durations of the pixel points are adjusted, and then the first image and the second image of the object to be shot are obtained by the first image sensor and the second image sensor respectively, and the image splitting is performed on the second image to obtain the third image having the same number of pixels as the first image, and finally the third image and the first image are composited to obtain the HDR image of the object to be shot. Thus, two camera assemblies are used for shooting, the first camera assembly being used to obtain one normal image, and the second camera assembly being used to obtain one image with respective combination pixel having different amounts of exposure, and then the two images are composited to generate the HDR image, during which the exposure durations of respective pixel points are adjusted dynamically according to the luminance of the pixel points, thus reducing the time used for shooting the HDR image, enhancing the effect of shooting the image, and improving the user experience.

Figure 7:
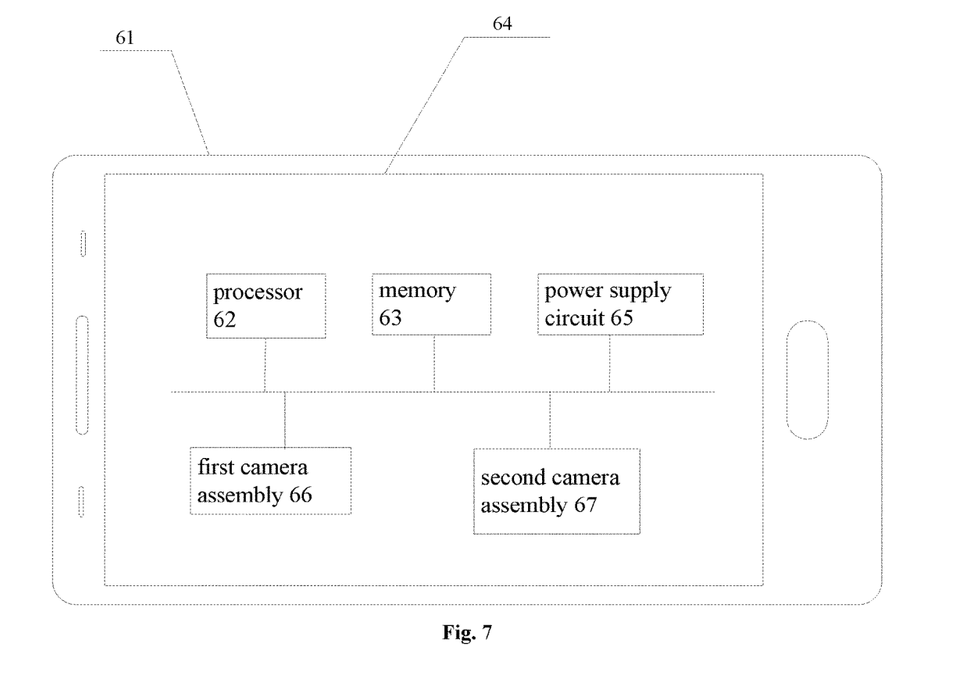
FIG. 7 is a block diagram of a terminal device according to an embodiment of the present disclosure.

FIG. 7 is a block diagram of a terminal device according to an embodiment of the present disclosure.

As illustrated in FIG. 7, the terminal device includes a housing 61, a processor 62, a memory 63, a circuit board 64, a power supply circuit 65, a first camera assembly 66 and a second camera assembly 67 received in the housing 61.

Each filter unit in the first camera assembly 66 is corresponding to one pixel point of a first image sensor of the first camera assembly 66, and each filter unit in the second camera assembly 67 is corresponding to n adjacent pixel points of a second image sensor of the second camera assembly 67, where n is greater than or equal to 2. The circuit board 64 is enclosed by the housing 61, and the processor 62 and the memory 63 are positioned on the circuit board 64. The power supply circuit 65 is configured to provide power for respective circuits or components of the terminal device. The memory 63 is configured to store executable program codes. The processor 62 is configured to run a program corresponding to the executable program codes by reading the executable program codes stored in the memory 63, so as to perform following operations: controlling the n adjacent pixel points corresponding to a same filter unit in the second image sensor to be under respective different amounts of exposure; obtaining a first image and a second image of an object respectively by the first image sensor and the second image sensor; performing an image splitting on the second image to obtain a third image having a same number of pixels as the first image; and performing an image composition on the third image and the first image to obtain an HDR image of the object.

It should be noted that, the above description for embodiments of the method for shooting an image is also applicable to the terminal device in this embodiment, both have the same implementation principle, which is not elaborated here.

With the terminal device according to embodiments of the present disclosure, the n adjacent pixel points corresponding to the same filter unit in the second image sensor are controlled to be under different amounts of exposure, and the first image and the second image of the object to be shot are obtained by the first image sensor and the second image sensor respectively, and then the image splitting is performed on the second image to obtain the third image having the same number of pixels as the first image, and finally the third image and the first image are composited to obtain the HDR image of the object to be shot. Thus, two camera assemblies are used for shooting, the first camera assembly being used to obtain one normal image, and the second camera assembly being used to obtain one image with respective combination pixel having different amounts of exposure, and then the two images are composited to generate the HDR image, thus reducing the time used for shooting the HDR image, enhancing the effect of shooting the image, and improving the user experience.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

In addition, terms such as "first" and "second" are used herein for purposes of description and are not intended to indicate or imply relative importance or significance or to imply the number of indicated technical features. Thus, the features defined with "first" and "second" may comprise or imply at least one of these features. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A method for shooting an image by a first camera assembly and a second camera assembly, wherein each filter unit in the first camera assembly is corresponding to one pixel point of a first image sensor of the first camera assembly, each filter unit in the second camera assembly is corresponding to n adjacent pixel points of a second image sensor of the second camera assembly, where n is greater than or equal to 2, and the method comprises:
   controlling the n adjacent pixel points corresponding to a same filter unit in the second image sensor to be under respective different amounts of exposure;
   obtaining a first image and a second image of an object respectively by the first image sensor and the second image sensor;
   performing an image splitting on the second image to obtain a third image having a same number of pixels as the first image; and
   performing an image composition on the third image and the first image to obtain a high dynamic range image of the object.

2. The method according to claim 1, wherein controlling n adjacent pixel points corresponding to a same filter unit in the second image sensor to be under respective different amounts of exposure comprises:
   controlling n adjacent pixel points corresponding to a same filter unit in the second image sensor to be subjected to respective different exposure durations; and/or
   controlling n adjacent pixel points corresponding to a same filter unit in the second image sensor to be corresponding to respective different illuminations.

3. The method according to claim 2, wherein after controlling n adjacent pixel points corresponding to a same filter unit in the second image sensor to be corresponding to respective different illuminations, the method further comprises:
determining whether a luminance of each pixel point is within a preset range; and
if the luminance of any pixel point is out of the preset range, increasing or decreasing the exposure durations of respective pixel points.

4. The method according to claim 3, wherein each filter unit in the second camera assembly is corresponding to 2*2 adjacent pixel points in the second image sensor.

5. The method according to claim 3, wherein before controlling the n adjacent pixel points corresponding to a same filter unit in the second image sensor to be under respective different amounts of exposure, the method further comprises:
receiving a command for shooting the high dynamic range image.

6. The method according to claim 2, wherein each filter unit in the second camera assembly is corresponding to 2*2 adjacent pixel points in the second image sensor.

7. The method according to claim 2, wherein before controlling the n adjacent pixel points corresponding to a same filter unit in the second image sensor to be under respective different amounts of exposure, the method further comprises:
receiving a command for shooting the high dynamic range image.

8. The method according to claim 1, wherein performing an image splitting on the second image to obtain a third image having a same number of pixels as the first image comprises:
performing an interpolation operation on the pixels in the second image to obtain the third image having the same number of pixels as the first image.

9. The method according to claim 8, wherein each filter unit in the second camera assembly is corresponding to 2*2 adjacent pixel points in the second image sensor.

10. The method according to claim 1, wherein each filter unit in the second camera assembly is corresponding to 2*2 adjacent pixel points in the second image sensor.

11. The method according to claim 10, wherein a number of pixel points in the first image sensor is same as a number of pixel points in the second image sensor.

12. The method according to claim 1, wherein before controlling the n adjacent pixel points corresponding to a same filter unit in the second image sensor to be under respective different amounts of exposure, the method further comprises:
receiving a command for shooting the high dynamic range image.

13. An apparatus for shooting an image, comprising:
a first camera assembly comprising a plurality of first filter units and a first image sensor the plurality of first filter units being corresponding to a plurality of pixel points of the first image sensor in a one-to-one relationship;
a second camera assembly comprising a plurality of second filter units and a second image sensor, each of the plurality of second filter units being corresponding to n adjacent pixel points of a plurality of pixel points of the second image sensor, where n is greater than or equal to 2; and
a processor configured to:
control the n adjacent pixel points corresponding to a same filter unit in the second image sensor to be under respective different amounts of exposure;
obtain a first image and a second image of an object respectively by the first image sensor and the second image sensor;
perform an image splitting on the second image to obtain a third image having a same number of pixels as the first image; and
perform an image composition on the third image and the first image to obtain a high dynamic range image of the object.

14. The apparatus according to claim 13, wherein the processor is configured to control the n adjacent pixel points corresponding to a same filter unit in the second image sensor to be under respective different amounts of exposure by performing acts of:
controlling n adjacent pixel points corresponding to a same filter unit in the second image sensor to be subjected to respective different exposure durations; and/or
controlling n adjacent pixel points corresponding to a same filter unit in the second image sensor to be corresponding to respective different illuminations.

15. The apparatus according to claim 14, wherein the processor is configured to control the n adjacent pixel points corresponding to a same filter unit in the second image sensor to be under respective different amounts of exposure by performing acts of:
determining whether a luminance of each pixel point is within a preset range; and
increasing or decreasing the exposure durations of respective pixel points, if the luminance of any pixel point is out of the preset range.

16. The apparatus according to claim 13, wherein the processor is configured to perform an image splitting on the second image to obtain a third image having a same number of pixels as the first image by performing an act of:
performing an interpolation operation on the pixels in the second image to obtain the third image having the same number of pixels as the first image.

17. The apparatus according to claim 13, wherein each filter unit in the second camera assembly is corresponding to 2*2 adjacent pixel points in the second image sensor.

18. The apparatus according to claim 17, wherein a number of pixel points in the first image sensor is same as a number of pixel points in the second image sensor.

19. The apparatus according to claim 13, wherein the processor is further configured to:
receive a command for shooting the high dynamic range image.

20. A terminal device, comprising a housing, a processor, a memory, a circuit board, a power supply circuit, a first camera assembly and a second camera assembly received in the housing, wherein each filter unit in the first camera assembly is corresponding to one pixel point of a first image sensor of the first camera assembly, each filter unit in the second camera assembly is corresponding to n adjacent pixel points of a second image sensor of the second camera assembly, where n is greater than or equal to 2; the circuit board is enclosed by the housing, and the processor and the memory are positioned on the circuit board; the power supply circuit is configured to provide power for respective circuits or components of the terminal device; the memory is configured to store executable program codes; and the processor is configured to run a program corresponding to the executable program codes by reading the executable program codes stored in the memory, to perform following operations:
- controlling the n adjacent pixel points corresponding to a same filter unit in the second image sensor to be under respective different amounts of exposure;
- obtaining a first image and a second image of an object respectively by the first image sensor and the second image sensor;
- performing an image splitting on the second image to obtain a third image having a same number of pixels as the first image; and
- performing an image composition on the third image and the first image to obtain a high dynamic range image of the object.

* * * * *